United States Patent
Frodigh et al.

(10) Patent No.: US 6,381,458 B1
(45) Date of Patent: Apr. 30, 2002

(54) METHOD AND SYSTEM FOR SOFT HANDOFF CONTROL BASED ON ACCESS NETWORK CAPACITY

(75) Inventors: Magnus Frodigh, Sollentuna; Jens Knutsson, Danderyd; Magnus Madfors, Täby; Magnus Persson, Sollentuna, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/079,228

(22) Filed: May 15, 1998

(51) Int. Cl.[7] .................................................. H04Q 7/20
(52) U.S. Cl. .......................... 455/442; 455/452; 455/453
(58) Field of Search ............................... 455/436, 438, 455/442, 437, 452, 453, 445

(56) References Cited

U.S. PATENT DOCUMENTS

| | | | |
|---|---|---|---|
| 5,267,261 A | * 11/1993 | Blakeney, II et al. | 370/332 |
| 5,448,750 A | * 9/1995 | Eriksson et al. | 455/33.1 |
| 5,584,049 A | 12/1996 | Weaver, Jr. et al. | 455/67.1 |
| 5,781,861 A | * 7/1998 | Kang et al. | 455/442 |
| 5,809,423 A | * 9/1998 | Benveniste | 455/452 |
| 5,884,174 A | * 3/1999 | Nagarajan et al. | 455/436 |
| 5,960,347 A | * 9/1999 | Ozluturk | 455/442 |
| 6,002,933 A | * 12/1999 | Bender et al. | 455/442 |
| 6,151,502 A | * 11/2000 | Padovani et al. | 455/442 |

FOREIGN PATENT DOCUMENTS

| | | |
|---|---|---|
| EP | 505341 | 9/1992 |
| GB | 2314732 | 1/1998 |
| GB | 2316578 | 2/1998 |
| WO | WO97/08911 | 3/1997 |
| WO | 98/05129 | 2/1998 |
| WO | 98/05175 | 2/1998 |
| WO | WO99/60797 | 11/1999 |

OTHER PUBLICATIONS

Hyoung–Goo Jeon et al., "A Channel Assignment Scheme for Reducing Call Blocking Rate in a DS–CDMA Cellular System", 1997 IEEE (Aug. 1997), pp. 637–641.

* cited by examiner

*Primary Examiner*—Lee Nguyen
(74) *Attorney, Agent, or Firm*—Burns, Doane, Swecker & Mathis, L.L.P.

(57) ABSTRACT

A radiocommunication system balances interference reduced by soft handoff with access network loading increased by soft handoff. When the access network loading exceeds some threshold for a particular transmission source, then the system limits or reduces that source's soft handoff connections with remote stations.

18 Claims, 4 Drawing Sheets

METHOD AND SYSTEM FOR SOFT HANDOFF CONTROL BASED ON ACCESS NETWORK CAPACITY

BACKGROUND

The present invention generally relates to increasing data throughput and quality in a wireless communication system and, more particularly, to systems and methods involving adaptation of soft handoff usage based on access network capacity in radiocommunication systems.

The growth of commercial communication systems and, in particular, the explosive growth of cellular radiotelephone systems have compelled system designers to search for ways to increase system capacity without reducing communication quality beyond consumer tolerance thresholds. At the same time usage of mobile communication equipment for transmission of data rather than speech has become increasingly popular by consumers. The ability to send and receive electronic mail and to use a web browser to obtain worldwide-web access is frequently discussed among services that will be used more and more in wireless communication systems. In response to this, communication system designers search for ways to efficiently transfer data information to and from mobile users and, in particular, to provide high data rate transfer capability.

Many radiocommunication systems have been designed in accordance with various standards, e.g., adopted on a country-wide or region-wide basis, in order to provide a roadmap for technological and service compatibility. For example, D-AMPS (IS-136) has been specified for North America, GSM for Europe and PDC for Japan. In considering ways to provide high data rate transfer capabilities, designers should also take into account existing standards in an effort to minimize the impact of design changes on the relevant standard(s) and legacy equipment.

However, costs associated with extending the capacity of the access network are severe. Accordingly, Applicants anticipate that, in some implementations, designers and/or network operators may opt to increase the throughput of the air interface without immediately providing sufficient access network capacity to handle a fully loaded air interface. Accordingly, it is desirable to find techniques for balancing capacity limits of the access network with other objectives of a radiocommunication system, e.g., reducing interference on the air interface. Such balancing techniques are also very interesting for CDMA systems.

In a typical CDMA system, an information data stream to be transmitted is impressed upon a much higher bit rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlap all of the other coded signals, as well as noise-related signals, in both frequency and time. By correlating the composite signal with one of the unique spreading codes, the corresponding information signal can be isolated and decoded.

The need for transmit power control in the uplink is recognized in current CDMA cellular systems, as may be seen from "Mobile Station-Base Station Compatibility Standard for Dual-Mode Wideband Spread Spectrum Cellular System," TIA/EIA Interim Standard TIA/EIA/IS-95 (July-1993) and its revision TIA/EIA Interim Standard TIA/EIA/IS-95-A (May 1995). Such standards that determine the features of U.S. cellular communication systems are promulgated by the Telecommunications Industry Association and the Electric Industries Association located in Arlington, Va.

Future Wideband CDMA systems will use fast downlink power control, i.e., power control based on quality measurements in the base station, and send power control commands to mobile stations to decrease or increase the output power towards a defined target. One such method is described in European Patent Publication No. 0 680 160 by Dohi et al.

While cellular systems were originally designed to operate with one-to-one correspondence between a mobile station and an associated base station covering a geographic cell, it has been determined that the effects of shadowing and fading can be reduced by communicating the same signal to a mobile station over more than one link. In systems using fast power control, like CDMA and wideband CDMA systems, a one-to-one correspondence would result in a low capacity compared to communication over more than one link. The capacity reduction will be particularly severe in the uplink. To overcome this, a multi-link communication can be established, both in the up- as well as the downlink, so that two or more base stations communicate the same information to a mobile station over two different spatially offset links. For the downlink this means that transmission occurs from two or more base stations and in the uplink two or more base stations listen to signals transmitted from mobile station. The mobile station processes the signals from the two links by selecting or combining them in some way, e.g., maximal ratio combining. This technique is known as diversity. Conventional spatial diversity techniques employ two or more. separated antennas in a single base station, or two or more base stations, to communicate with a mobile station. However, diversity is not limited to spatially offsetting base stations or antennas (i.e., multiple transmission paths). Diversity transmission can also be generated using one or more of an offset in time, polarization, or frequency.

One area in which macro diversity is commonly practiced is during handoff. In such cases, the candidate base station (i.e., the base station to which a mobile station is to be handed off) starts transmitting substantially the same message information to the mobile station before the current, serving base station terminates its transmission of that message information. This usage of macro diversity is commonly referred to as soft handoff. Soft handoff is described in U.S. Pat. No. 5,109,528 to Uddenfeldt and U.S. Pat. No. 5,327,577 to Uddenfeldt, both of which are expressly incorporated here by reference.

FIG. 1 illustrates a soft handoff arrangement wherein a first, original base station 202 and a second, candidate base station 204 each transmit a same message 206 to a mobile station 208. The message 206 is transmitted to the mobile station 208 over different signal paths in the forms of a first downlink 210 and a second downlink 212. The first and second downlink signals 210 and 212 are recombined (or one of the received signals is selected) in the mobile station 208 to extract the message 206. The mobile station 208 transmits to the base stations 202 and 204 over first and second uplink paths 214 and 216, respectively. At some point in time, the transmission of message information to the mobile station from the first, original base station 202 is terminated and the soft handoff process is concluded.

As transmission between the base station and Radio Access Network Nodes, e.g., RNC (Radio Network Controller), is expensive, it becomes evident that one drawback with soft handover is the increased load between the base station and the RNC. The total load between the RNC and the base stations associated with a single user is proportional to the number of base stations in its active set.

In a soft handoff arrangement, the base stations, and/or antennas communicating with a particular mobile station are known as "active set" members. For example, referring back to FIG. 1, base stations 202 and 204 would be considered members of the active set. Those skilled in the art will appreciate that more than two base stations and/or antennas can be part of the active set. Members of an active set can change as the mobile station passes into and out of coverage areas handled by base stations and/or antennas in the system.

Soft handoff has been used in many different types of radiocommunication systems, including those using time division multiple access (TDMA) and code division multiple access (CDMA). Soft handoff increases robustness, achieves improved downlink quality, and combats fading. However, soft handoff may sometimes negatively impact system capacity and network resources due to the additional transmitting source(s) used to transmit substantially the same information to a receiver. For example, as described in the article entitled "A Channel Assignment Scheme for Reducing Call Blocking rate in a DS-CDMA Cellular System" by Hyoung-Goo Jeon et al., if all downlink codes are used, and a call needs to be placed, then a reverse traffic channel can be freed on the air interface by dropping a link being used in soft handoff. However, this article fails to recognize, as Applicants have, that capacity limitations may occur not only in the air interface, but in the ground-based access interfaces as well.

Accordingly, Applicants have determined that it would be desirable to balance the benefits of soft handoff in the air interface with the drawbacks of soft handoff in terms of access network capacity.

SUMMARY

These and other drawbacks and limitations of conventional methods and systems for communicating information are overcome according to the present invention, wherein Applicants present techniques and systems to adjust soft handoff algorithms based on the access network's current load. For example, according to one exemplary embodiment, when a transmission link between a base station and a radio network controller is substantially fully utilized, the soft handoff margin for new connections to this base station can be reduced.

According to another exemplary embodiment, when a transmission link between a base station and a radio network controller is substantially fully utilized, the soft handoff margin for both ongoing and new connections to this base station can be reduced. In this way, the active set of existing connections in soft handoff mode can be reduced so that capacity is freed in the access network to establish new connections.

According to another exemplary embodiment of the present invention, when a transmission link between a base station and a radio network controller is substantially fully utilized, no more than two members are allowed in the active set for new connections which are to enter soft handoff mode using this base station as a transmission source.

According to still another exemplary embodiment of the present invention, when a transmission link between a base station and a radio network controller is substantially fully utilized, no more than two members are allowed in the active set for both new and ongoing connections in soft handoff mode using this base station as a transmission source.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of CDMA radiocommunication systems. However, those skilled in the art will appreciate that this access methodology is merely used for the purposes of illustration and that the present invention is readily applicable to all types of access methodologies including frequency division multiple access (FDMA), time division multiple access (TDMA), code division multiple access (CDMA) and hybrids thereof.

Since soft handoff involves transmitting substantially the same information from multiple transmission sources at substantially the same time, the overhead signalling which takes place on the access network to coordinate the processing of soft handoff mode is substantial. In addition, the multiple data flows which are generated in soft handoff modes may cause a major load on the access network. Whether a particular remote station is in soft handoff mode at any given time depends, among other things, on the location of the remote station. If a large percentage of the number of remote units connected to the system are in soft handoff mode, the loading on the access network may be much higher than the loading on the radio network (air interface). According to the present invention, the load of the access network can be applied by the soft handoff functionality to control how many members the active set should contain, both for existing soft handoff mode connections and new soft handoff mode connections.

Two approaches can be considered in determining when to activate the soft handoff rules of the present invention. Under a first approach, which is more of a predictive approach, the network measures the load on the access network in order to avoid an overload situation. When the network determines that it is reaching its maximum then the soft handoff rules, according to the present invention, will be implemented. Under a second approach, which is more of a corrective approach, the network implements the soft handoff rules when it determines that it cannot handle a new connection. Additionally, in one embodiment, the load limit in the access network can be either in the BS to RNC direction or in the RNC to BS communication direction. Thus, reducing mobiles in soft handoff based on load will minimize the number of connections to adjust. When the RNC to BS communication in the access network is fully loaded, then a user that uses a high bitrate in the downlink should preferably be moved from this base station, e.g., by dropping this soft handoff link completely or moving the link to another base station.

Figure 1:
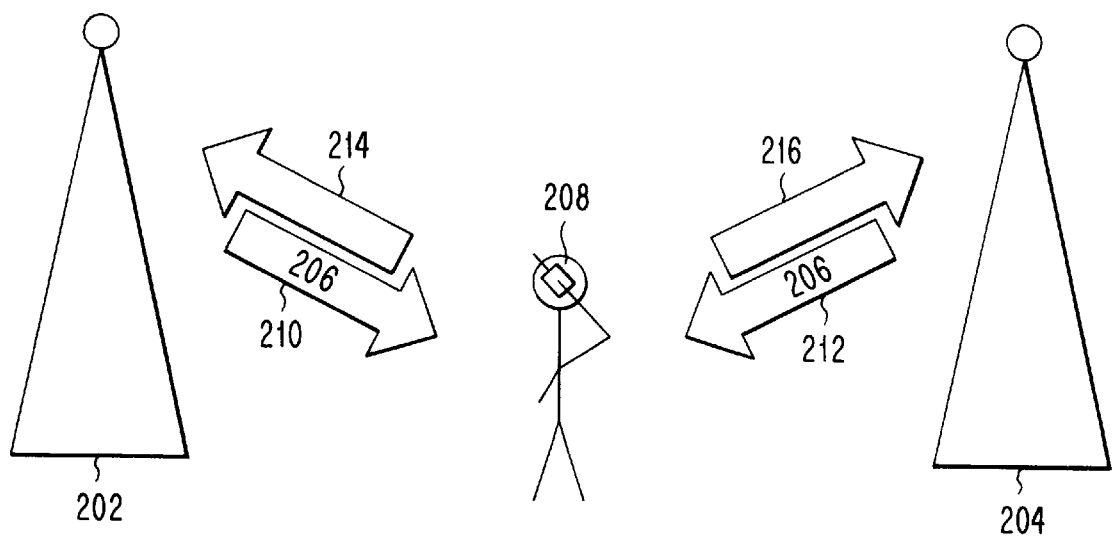
FIG. 1 depicts a soft handoff mode of operation involving two base stations.
Figure 2:
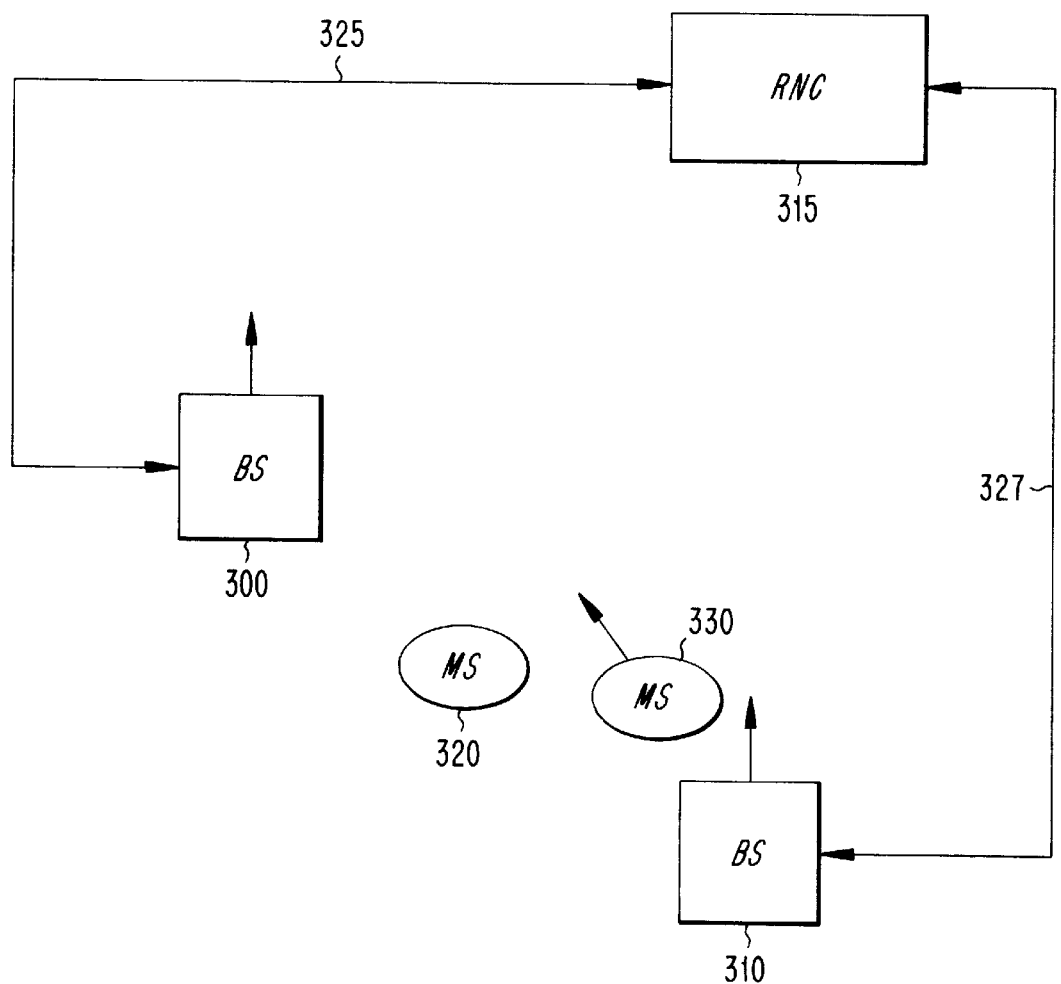
FIG. 2 illustrates an exemplary soft handoff scenario involving access network load measurement according to the present invention.

Consider the exemplary situation depicted in FIG. 2. Therein, a base station 300 supports radiocommunication services in a first cell and base station 310 supports radiocommunication services in a second cell. The base stations 300 and 310 are in communication with a radio network controller 315 (RNC) (possibly via a mobile switching center (MSC) and/or other nodes which are not shown here), which in turn is connected to a public switched telephone network (PSTN, not shown). The links 325 and 327 between each of the base stations 300 and 310, respectively, and the RNC 315 are referred to herein as the access network and may, for example, be embodied as optical links which transfer information using pulse code modulated (PCM) slots. The transmission of information between the base stations and, for example, mobile station 320 occurs over the air interface. For the purposes of this exemplary embodiment, consider that the air interface associated with the system depicted in FIG. 3 operates using a CDMA technology with duplexed downlink (i.e. base-to-mobile direction) and uplink (i.e. mobile-to-base direction) channels. In the context of this exemplary CDMA system, a physical channel is identified by its code (i.e., short, long or combination thereof), frequency and bandwidth.

This example also depicts mobile station 320 disposed near the cell boundary between base stations 300 and 310 and mobile station 330 which is approaching this cell boundary. Of course, those skilled in the art will appreciate that base stations 300 and 310 would typically support connections with many mobile stations concurrently, however interaction between these two exemplary mobile stations and the network is sufficient to illustrate soft handoff/ macrodiversity techniques according to the present invention. In this example, mobile station 320 is stationary or substantially stationary relative to the two base stations, while mobile station 330 is moving in the direction of the illustrated arrow toward the cell boundary. However, mobile station 320 is currently receiving transmissions from both base stations, i.e., is in soft handoff mode, while mobile station 330 is about to become eligible to enter soft handoff mode.

As is well known in the art, each mobile station will monitor the transmissions of neighboring sources, e.g., base stations, while it is connected to the system. For example, information regarding the received signal quality and/or strength is returned to the system and used to place these neighboring sources in that mobile station's candidate set. At certain times, one or more of the sources in the candidate set may be added to the active set. For example, in many systems and particularly CDMA systems, when a mobile station approaches a cell boundary, the mobile station may enter a region wherein another transmission source (e.g., another base station) begins to transmit substantially the same information to that mobile station. The mobile station can then combine the plural received signals to create a composite that has better quality than that which would have resulted from only receiving the information from one source. Further, since the power control is fast enough to track the Rayleigh fading, soft handover will also reduce the interference in the system. The interference reduction is especially significant in the uplink.

The network recognizes that a mobile station should be added or dropped from the active set by monitoring, for instance, the uplink or downlink signal strength or the C/I at which the mobile station receives transmissions from its neighboring sources and comparing the monitored values with predetermined thresholds. For example, as described in the above-mentioned article entitled "A Channel Assignment Scheme for Reducing Call Blocking rate in a DS-CDMA Cellular System" by Hyoung-Goo Jeon et al., the system can have a predefined parameter $T_{13}$ DROP such that if the measured signal strength is less than $T_{13}$ DROP, a transmission source is removed from the active set and a predefined parameter $T_{13}$ ADD such that if the measured signal strength exceeds $T_{13}$ ADD, the corresponding transmission source is added to the active set. Another example of a method for altering the number of mobile stations in soft handover is to adjust a timer which are commonly used in soft handover algorithms. The purpose of these timers is to delay the soft handover decision, so that the decision is not executed as soon as a threshold is crossed, but rather when the threshold has been exceeded during a certain amount of time.

The Jeon article suggests that when many downlink codes are being used, the value of T_DROP can be altered to release traffic channels being used in soft handoff so that these traffic channels can be reused to establish new calls and prevent call blocking attributable to RF channels being unavailable for establishing communication over the air interface. However, Applicants have found that call blocking (or packet delay in the case of data communications) may occur due to loading in the access network, instead of shortage of downlink codes.

Thus, the present invention balances interference in the air interface with loading in the access network. When the loading of the access network reaches some predetermined threshold such that the link between a base station and the RNC is fully utilized or nearly fully utilized, parameters used by the soft handoff algorithm handled by the base station or some other node in the system can be adjusted to reduce or limit the number of transmission sources involved in soft handoff connections. For example, when the access network loading threshold is reached for link 325, then the soft handoff margin for new connections to this base station is reduced. Thus, when mobile station 330 enters a region where it might normally receive transmissions from base station 300 in soft handoff mode, it might not receive such transmissions according to the present invention. This embodiment limits additional soft handoff mode connections when the access network load limit is reached.

Alternatively, it may be desirable to reduce the number of soft handoff mode connections associated with a particular base station when its access network load threshold is reached. Accordingly, the soft handoff margin for both ongoing and new connections to this base station may be reduced. For example, the soft handoff margin for both mobile stations 320 and 330 may be reduced, whereby the base station 300 may be dropped from mobile station 320's active set and may not be added to the active set of mobile station 330 depending upon their proximity to this base station.

Figure 3:
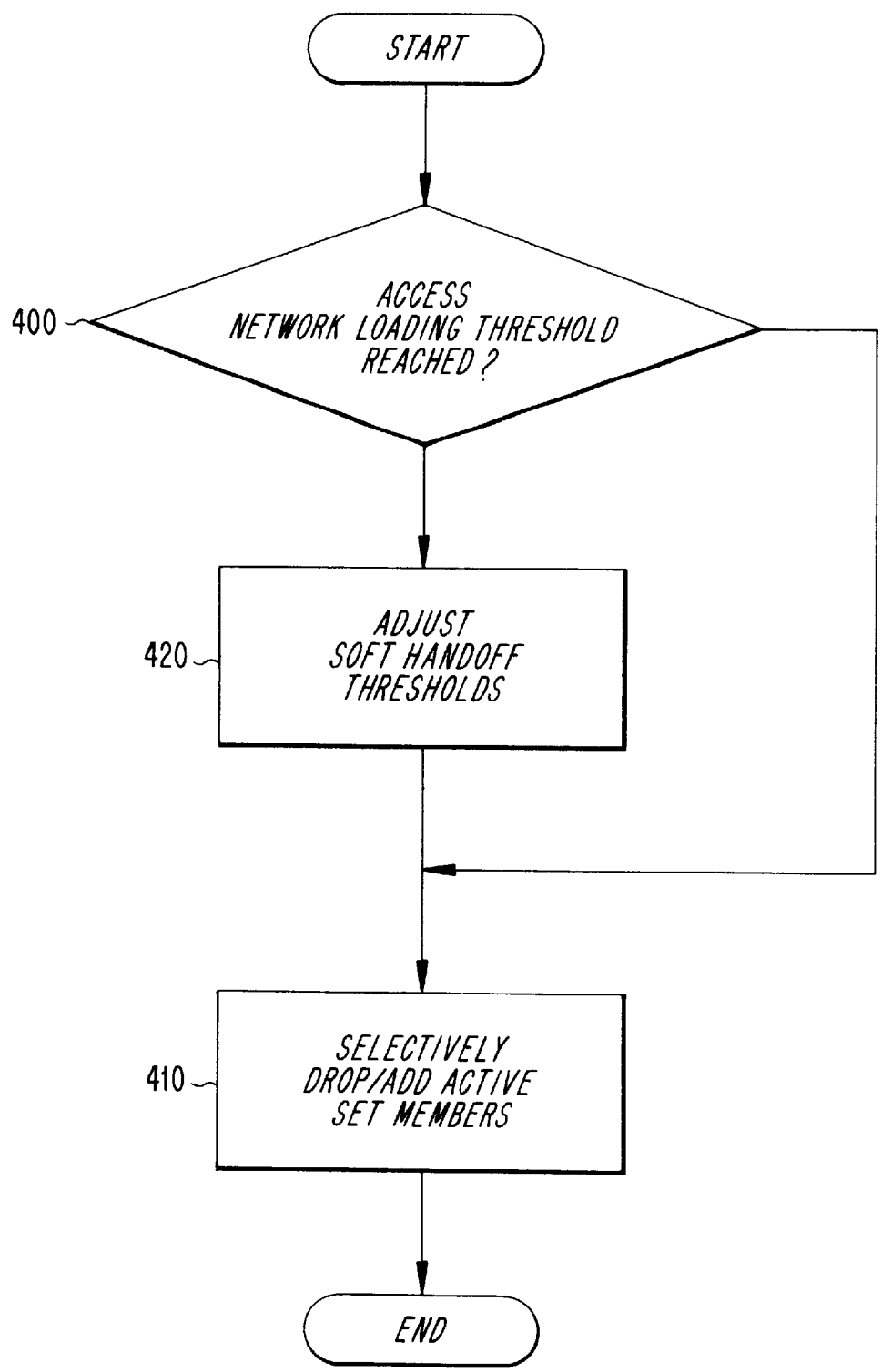
FIG. 3 is a flow chart illustrating a method of limiting or reducing soft handoff links based on access network loading according to an exemplary embodiment of the present invention.

The last two examples of adjusting soft handoff functionality in connection with access network loading can be summarized using the flowchart of FIG. 3. Therein, at step 400, the system checks to see whether the access network loading threshold has been reached or exceeded for a particular base station. If not, then the system selectively adds and/or drops the base station from the active set of mobile stations in soft handoff mode using unadjusted received signal strength thresholds at step 410. If the access loading threshold has been reached or exceeded for that base station, then the signal strength parameters can be adjusted to limit the number of new soft handoff connections made to this base station and/or to reduce the number of ongoing soft handoff mode connections at step 420. This process can be performed periodically and, as implied by step 400, once the access network loading decreases past the threshold, the unadjusted parameters would again be used to control soft handoff connections.

As an alternative to changing a soft handoff margin when attempting to balance access network loading against interference, the number of links involved in each soft handoff connection can be evaluated. For example, when the access network loading threshold for a particular base station is reached or exceeded, the base station may not become involved as the third transmitting source (or fourth or second) in the active set of a mobile station connected in soft handoff mode. Additionally, it may terminate its transmissions for soft handoff connections where it is only the third (or fourth or second) strongest member of the active set.

Once the soft handoff thresholds have been adjusted (step 420), it may be desirable to restore the thresholds or timers to their former values. Such restoration can be either time dependent (e.g., the thresholds or timers are restored after some predetermined time period) or load dependent, or a combination of both time and load.

Although the invention has been described in detail with reference only to preferred embodiments, those skilled in the art will appreciate that various modifications can be made without departing from the invention. For example, it will be apparent that many other techniques exist for reducing the number of soft handoff links when access network loading becomes too high.

Figure 4:
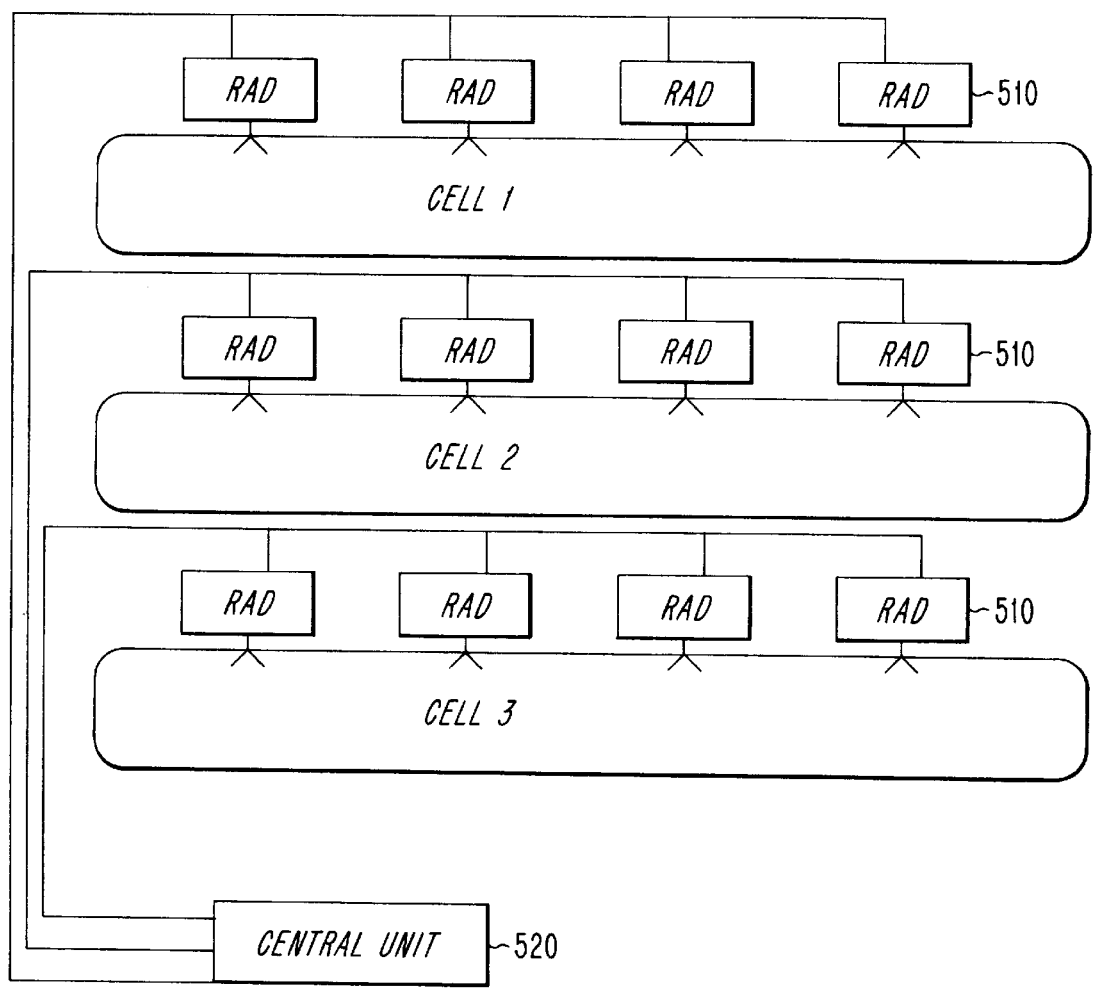
FIG. 4 illustrates a distributed microcellular indoor system in which the present invention may be implemented.

Similarly, the system in which the invention operates should not be considered to be limited to the system used to exemplify the invention. For example, FIG. 4 illustrates another type of cellular system (i.e., a distributed microcellular indoor system) in which the present invention could be implemented. In this type of system several RADs (Radio Antenna Devices) 510 may communicate the same signals to a mobile user both in the uplink and the downlink. Thus, one skilled in the art will recognize that the present invention would be equally applicable to these types of distributed networks, i.e., ones built up by several RADs and a Central Unit 520.

In yet another alternative embodiment of the present invention, a soft handoff algorithm may operate to selectively allow certain soft handoff connections or number of base stations in an active set, dependent upon load in the access network interface(s). This selection may be performed asymmetrically relative to the uplink and downlink of a particular connection. For example, there may be a need to keep a particular base station in an active set in the uplink and yet release it from, or prevent it from being added to, an active set in the downlink. The reverse is also possible. This may be referred to herein as asymmetrical active sets, i.e., a mobile station which has a different number of sources to which it is transmitting in the uplink than which are transmitting thereto in the downlink, which asymmetry may be dependent upon the load in the uplink and downlink, respectively, as well as the load in the access network interface(s). This solution may be particularly advantageous in systems where the access network interfaces (e.g., the A-bis interface and A interface) are realized with ATM techniques.

The selective permission to the active set described above may also be service dependent, e.g., certain services may have a higher priority, which connections should not be prevented from adding base stations to their active sets. Of course, lower prioritized services will then be more likely to have transmitting sources removed from active sets.

When an active set includes member base stations that are being served by different RNCs, then it may be desirable to also consider the load in the A interface, i.e., the connection between the RNC and the MSC, when determining thresholds or selectively removing or preventing certain members from membership in certain active sets.

The foregoing embodiments can be used in conjunction with methods and systems described in U.S. patent application Ser. No. 09/079,231, entitled "Methods and Systems for Mode Selection Based on Access Network Capacity", filed on the same date as this application, the disclosure of which is expressly incorporated herewith.

The invention is defined only by the following claims which are intended to embrace all equivalents thereof.

What is claimed is:

1. A method for communicating information in a radio-communication system comprising the steps of:

transmitting substantially the same message information from a plurality of sources to a remote station;

providing, as an access network, a link between each of said plurality of transmission sources and a central station;

determining if access network loading associated with one of said plurality of sources exceeds a threshold;

evaluating transmissions from said one of said plurality of sources using a result of said determining step; and selectively terminating transmissions from said one of said plurality of sources based upon a result of said evaluating step, wherein each of said plurality of sources communicates with the remote station via a plurality of antenna elements in both an uplink and downlink direction, wherein a first active set associated with the uplink direction can have a different number of members than a second active set associated with said downlink direction and wherein members of the first and second active sets are selected based on air interface parameters and loading of the access network.

2. The method of claim 1, wherein said step of evaluating further comprises the step of evaluating said transmissions against a first threshold if said threshold has been exceeded and otherwise against a second threshold.

3. The method of claim 2, wherein said thresholds are adjusted in response to network loading or a timer.

4. The method of claim 2, wherein said first threshold is higher than said second threshold wherein said step of selectively terminating is more likely to terminate transmissions to a remote station when said access network is highly loaded.

5. The method of claim 1, wherein said plurality of sources comprise a plurality of base stations.

6. A radiocommunication system comprising:

means for transmitting information between a central station and a plurality of transmission sources over an access network;

means for transmitting substantially the same information from said plurality of transmission sources to a remote station over an air interface, wherein each of said plurality of sources communicates with the remote station via a plurality of antenna elements in both an uplink and downlink direction, wherein a first active set associated with the uplink direction can have a different number of members than a second active set associated with said downlink direction and wherein members of the first and second active sets are selected based on air interface parameters and loading of the access network;

means for determining a load on said access network between one of said plurality of transmission sources and said central station;

means for evaluating transmissions from said one of said plurality of transmission sources using an output of said determining means; and means for selectively terminating transmissions from said one of said plurality of sources based upon an output of said evaluating means.

7. The system of claim 6, wherein said means for evaluating compares a parameter associated with transmissions from said one of said plurality of transmission sources to a first threshold if said remote station is substantially stationary and otherwise against a second threshold.

8. The system of claim 7, wherein said thresholds are adjusted in response network loading or a timer.

9. The system of claim 6, wherein said plurality of sources comprise a plurality of base stations.

10. The system of claim 7, wherein said first threshold is higher than said second threshold wherein said means for selectively terminating is more likely to terminate said transmission source when said access network is substantially fully loaded with respect thereto.

11. A system for adjusting an active set of sources which transmit signals to a particular receiver comprising:

an access network load determining mechanism for determining loading on said access network relative to each of said sources in said active set, wherein each of said sources in said active set communicates with the particular receiver via a plurality of antenna elements in both an uplink and downlink direction, wherein a first active antenna element set associated with the uplink direction can have a different number of members than a second active antenna element set associated with said downlink direction and wherein members of the first and second active antenna element sets are selected based on air interface parameters and loading of the access network; and an evaluation function for comparing an uplink or downlink signal strength or C/I value of each source within said active set to a threshold, said threshold being variable depending upon said determined loading.

12. The system of claim 11, wherein said access network comprises a plurality of physical links between said sources and a central station.

13. A system for limiting membership of a transmission source in an active set of sources which transmit signals to a particular receiver comprising:

an access network load determining mechanism for determining loading on said access network relative to said transmission source, wherein said transmission source communicates with the particular receiver via a plurality of antenna elements in both an uplink and downlink direction, wherein a first active antenna element set associated with the uplink direction can have a different number of members than a second active antenna element set associated with said downlink direction and wherein members of the first and second active antenna element sets are selected based on air interface parameters and loading of the access network; and an evaluation function for limiting membership of said source in an active set to at least one of the Nth strongest members based upon said determined loading, wherein said access network includes at least one physical link between said transmission source and at least one node in a radiocommunication system.

14. The system of claim 13, wherein N is equal to two if said determined loading exceeds a threshold.

15. A method for limiting membership of a transmission source in an active set of sources which transmit signals to a particular receiver, said method comprising the steps of:

determining the load on an access network relative to said transmission source, wherein said transmission source communicates with the particular receiver via a plurality of antenna elements in both an uplink and downlink direction, wherein a first active antenna element set associated with the uplink direction can have a different number of members than a second active antenna element set associated with said downlink direction and wherein members of the first and second active antenna element sets are selected based on air interface parameters and loading of the access network; and limiting the membership of said source in an active set to at least one of the Nth strongest members based upon said determining step.

16. The method of claim 15 wherein said access network comprises a plurality of physical links between said source and at least one node in a radiocommunication system.

17. The system of claim 15, wherein N is equal to two if said determined loading exceeds a threshold.

18. A method for communicating information in a radiocommunication system comprising the steps of:

communicating said information between a remote station and a plurality of antenna elements in both an uplink and a downlink direction in soft handoff mode, wherein a first active set associated with said uplink direction can have a different number of members than a second active set associated with said downlink direction; and selecting members for said first and second active sets based on air interface parameters and loading of an access network, which access network includes at least one physical link in a fixed portion of said radiocommunication network.

* * * * *